United States Patent [19]

Nemeth

[11] 4,289,324
[45] Sep. 15, 1981

[54] FOLDING TRICYCLE WHEEL FOR FOLDING GOLF CART

[75] Inventor: Edwin A. Nemeth, 1620 Beechwood Dr., Martinez, Calif. 94553

[73] Assignee: Edwin A. Nemeth, Pittsburg, Calif.

[21] Appl. No.: 81,977

[22] Filed: Oct. 4, 1979

Related U.S. Application Data

[62] Division of Ser. No. 911,640, Jun. 1, 1978, Pat. No. 4,252,870, which is a division of Ser. No. 717,780, Aug. 25, 1976, Pat. No. 4,106,583.

[51] Int. Cl.³ .............................................. B62B 3/02
[52] U.S. Cl. ...................................... 280/38; 280/42; 280/651; 280/DIG. 5; 16/29
[58] Field of Search ............. 280/38, 42, 651, DIG. 5, 280/DIG. 6; 180/19 R; 16/18 R, 29

[56] References Cited

U.S. PATENT DOCUMENTS

| | | | |
|---|---|---|---|
| 2,962,294 | 11/1960 | Elias | 280/38 |
| 3,123,173 | 3/1964 | Jacobs | 280/DIG. 5 |
| 3,459,434 | 8/1969 | Dulaney | 280/38 |
| 3,705,731 | 12/1972 | Berchak | 280/651 |

Primary Examiner—Robert R. Song
Assistant Examiner—Donn McGiehan

[57] ABSTRACT

A golf bag carrying golf cart is disclosed which is easily stored in a collapsed compact position. A tricycle steering wheel is mounted on an arm which fits telescopically on an upwardly arching segment of a main column. The arching segment is secured by a pin to the main column in either a down position wherein the wheel is extended to a steering position or in an up position wherein the wheel is in a compact upwardly and inwardly projecting position such that the wheel is suspended by its own weight in a position approximately conforming to the upwardly arching segment of the main column.

4 Claims, 2 Drawing Figures

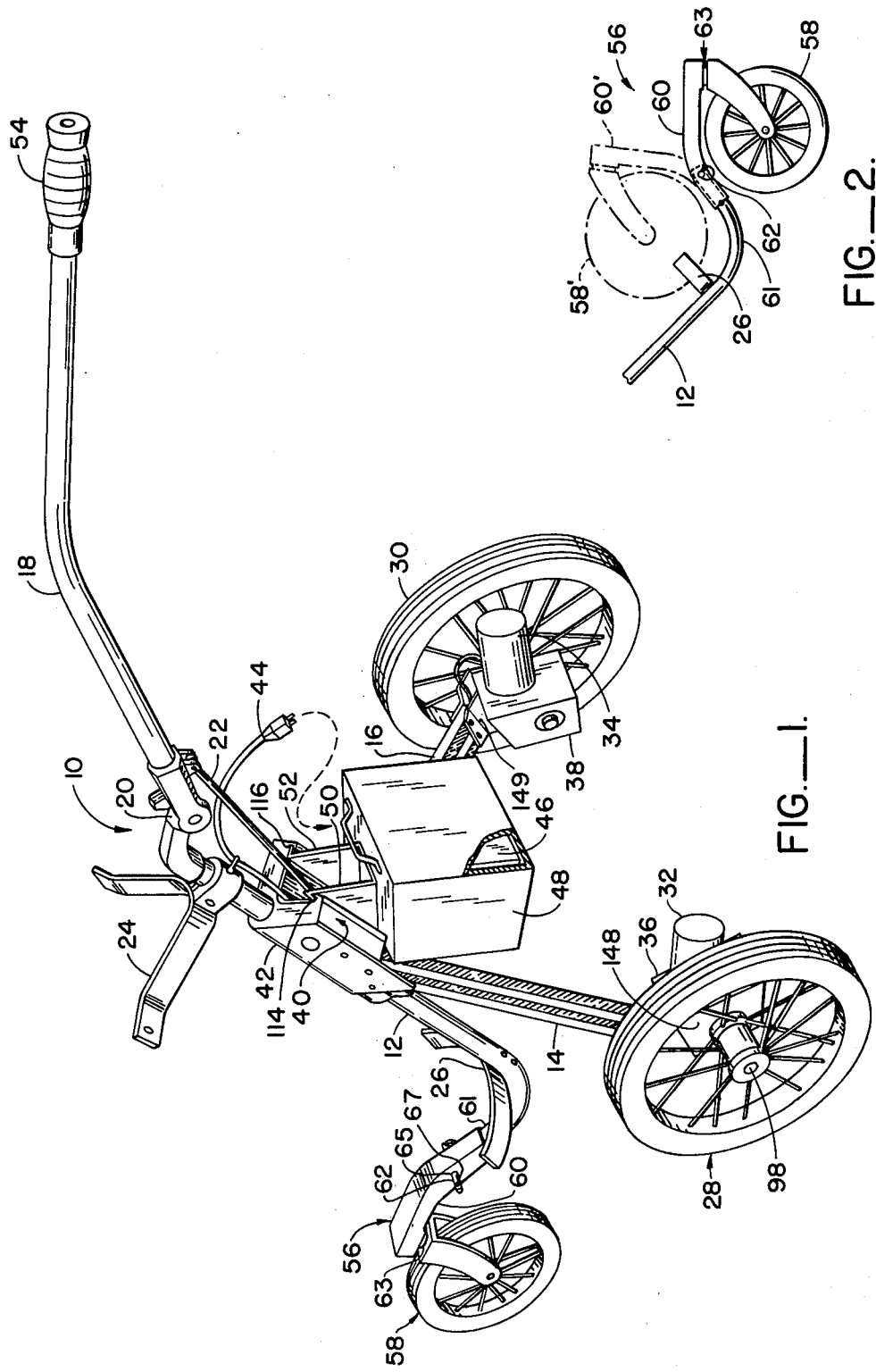

FOLDING TRICYCLE WHEEL FOR FOLDING GOLF CART

This is a division of application Ser. No. 911,640, filed June 1, 1978, now U.S. Pat. No. 4,252,870, issued Feb. 24, 1981, which is a division of application Ser. No. 717,780 filed Aug. 25, 1976, now U.S. Pat. No. 4,106,583, issued Aug. 15, 1978.

BACKGROUND OF THE INVENTION

1. Field of the Invention

This invention is related to self-powered electric carts and in particular to an electrically powered push-type collapsible tricycle cart having dual independent motor drive.

Electrically powered vehicles are quite popular on golf courses. However, vehicles large enough for transporting passengers are generally expensive and therefore beyond the means of the average golfer to purchase or to transport to and from the golf course. On the other hand, light pull- or push-type golf carts are known for caddying golf bags alone. Such non-powered carts are quite popular, especially if collapsible. However, a non-powdered cart becomes a major burden to drag or push around the golf course.

As a compromise, powered golf bag carrying carts have been proposed. However, such powered carts have not met with success for various reasons. A number of such problems, prior proposed solutions and shortcomings of these solutions are illustrated by the prior art.

2. Description of the Prior Art

One example of a powered golf club carrying cart is described in U.S. Pat. No. 3,704,758 to Cropp, wherein a pair of d.c. motors is series connected to a large bank of rather heavy multi-celled batteries. Such a device is costly, excessively heavy, bulky, unsightly and not easily stored or transported and therefore not readily acceptable by the average golfer. A relatively light, collapsible golf cart is therefore needed.

One proposed collapsible golf cart is described in U.S. Pat. No. 3,867,993 to Iizuka. The Iizuka patent describes a particular mechanism rendering a powered two-wheel cart collapsible. It has been found, however, that certain mechanisms of the Iizuka cart are subject to failure and frequent breakdown. For example, the legs of the Iizuka cart are subject to buckling and warping, and an internal main column slide bracket for supporting the legs is subject to jamming or sticking.

Two-wheeled carts are often found to be unsuited to power drive. Such carts with the power source (the battery) located along the main column may be easily upset if tipped too far. Prior three-wheeled arrangements, such as suggested in the Cropp patent may provide stability, but known arrangements are not suited to collapsible carts, where compact storability is a prerequisite.

It is often desirable to change the configuration of the collapsible carts slightly to accommodate the tastes of the operator or the terrain. For example, the operator may wish to raise or lower the steering arm, or it may be necessary to narrow the wheel base of the cart in order to negotiate a narrow path. It is thus desirable to include provision for adjusting steering arm height and for changing the drive wheel base without jeopardizing the performance of the cart. This might be done, for example, by assuring that the drive wheels remain parallel and vertical to the ground in cart configurations intermediate between fully collapsed and fully extended.

SUMMARY OF THE INVENTION

According to the invention, a golf bag carrying golf cart is provided which is easily stored in a collapsed compact position. The golf cart features a foldable tricycle support frame having parallel drive wheels and a tricycle steering wheel. The tricycle steering wheel is mounted on an arm which fits telescopically on an upwardly arching segment of a main column. The arm is secured by a pin to the main column in either a down position wherein the wheel is extended to a steering position confronting the ground or in an up position wherein the wheel is in a compact upwardly and inwardly projecting position such that the wheel is suspended by its own weight from the arm in a position approximately conforming to the upwardly arching segment of the main column.

A golf cart according to the invention incorporates a variety of advantages over the prior art, some of which are here listed. First, a cart as herein described is sufficiently powerful and sturdy enough to carry a load of golf clubs through the rugged terrain of a golf course. Second, the cart is relatively lightweight and energy efficient, so that it is easily handled and has a long service range. Third, the cart is easily adjusted to the preference of the user and can easily be stored in a collapsed compact position, for example in the trunk of a car. Fourth, the pivoting tricycle configuration removes any load carrying requirement from the operator, yet allows instant turning. Fifth, the differential scheme of the cart permits easy turning and prevents stalling in rough or uneven terrain. And sixth, the drive gearing and motors are protected against the danger of wheel shock damage through shock isolation between the wheels and the gearing.

Further advantages in the particular features of the invention are best understood by reference to the following detailed description and the accompanying drawings.

BRIEF DESCRIPTION OF THE DRAWINGS

FIG. 1 is a perspective view of a foldable golf club carrying cart according to the present invention; and FIG. 2 is a side view of third wheel castor assembly.

DETAILED DESCRIPTION OF PREFERRED EMBODIMENTS

FIG. 1 illustrates a golf club carrying tricycle cart 10 having a frame main column 12, legs 14 and 16 pivotally linked to the main column 12, and guiding arm 10 coupled to the main column 12 through an adjustable pivot 20 and supporting link 22. Golf bag supports 24 and 26 are provided on the main column 12 to support a golf bag (not shown) in an inclined position.

A pair of drive wheels 28 and 30 are each individually provided with electric motors 32 and 34, and drive trains 36 and 38, mounted at the end of each of the legs 14 and 16. The electric motors 32 and 34 are coupled to a power control circuit 40 which is mounted on the main column 12 within an enclosure 42. Power is provided through a cable 44, coupled to a power source, such as a d.c. battery 46, within a housing 48 detachably hung to the main column 12, on a pair of vertically disposed triangular struts 50 and 52 which retain the housing 48 in a relatively level position.

At the end of the guiding arm 18, a hand grip 54 is provided. The hand grip 54 serves both as a steering lever guiding the cart 10 and as a throttle for the motors 32 and 34.

Tricycle wheel assembly 56, including a pivotable caster wheel 58 rotatably coupled to a curved arm 60, is telescopically attached to the main column 12 and secured by a cotter pin 62. Referring to FIG. 2, it is seen that the lower portion of the main column 12 defines an upwardly arching segment 61 adjacent the end below the strut 26. The arm 60 is adapted to fit over the end of the main column 12 and to be secured in a first down position by the cotter pin 62 and in a second up position, as shown in phantom. in the down position, a pivot 63 through the arm 60 supporting the caster wheel 58 is approximately vertical with the ground. The wheel 58 is free to pivot to any orientation. In the second up position the axis of pivot is generally horizontal so that the caster wheel 58 hangs up by its own weight. In the up position, the wheel 58 (in phantom) is in a compact upwardly and inwardly projecting suspended position approximately conforming to the upwardly arching segment 61 and the arm 60 (in phantom). Moreover, the hanging wheel 58 (in phantom) with the cart upright is protected by the strut 26.

The cotter pin 62 (FIG. 1) is readily though forcibly insertable into and removeable from keyway 65 through curved arm 60 and curved segment 61. The cotter pin 62 is a straight rod with a collapsible stop button 67 at the insertable end suitable stop such as a ring 69 at the opposite end.

As other advantages and alternative embodiments are suggested to the person skilled in the relevant art, it is not intended that the invention herein described be limited, except as indicated by the following claims, which set forth the various inventive features.

I claim:
1. A golf club carrying cart comprising:
a collapsible frame for supporting a golf bag in an inclined position, first and second spaced apart wheels which are parallel in all positions, the frame including a main column defining an upwardly arching segment adjacent the lower end of the golf bag supporting portion of said frame; and
a pivotal third wheel means including a support arm, a caster wheel, and means for pivotally attaching said third wheel means to said support arm, wherein said support arm is telescopically attachable to said upwardly arching segment and flexible in a first down position forming in combination with said first and second spaced wheels a tricycle support, said third wheel means being further fixable in a second up position, such that in said up position said caster wheel is conformable to said upwardly arching main column segment.

2. A golf cart according to claim 1 wherein said third wheel attaching means comprises said support arm adapted to rotatably support said caster wheel, offset from the axis of castor wheel pivot and wherein said third wheel means support arm is bent such that said axis of pivot is generally vertical in said first down position and generally horizontal in said second up position.

3. A golf cart according to claim 2 wherein said third wheel attaching means further comprises a keyway transverse through said upwardly arching segment and through said support arm for receiving a cotter pin.

4. Apparatus according to claim 3, further including a cotter pin, said cotter pin comprising a straight rod having a collapsible stop button adjacent the normally inserted end, whereby said pin is readily though forcibly insertable into and removable from said keyway.

* * * * *